United States Patent [19]

Fradenburgh et al.

[11] Patent Number: 5,116,201
[45] Date of Patent: May 26, 1992

[54] ADJUSTMENT MEANS FOR HELICOPTER ROTOR BLADE VISCOUS DAMPER

[75] Inventors: Evan A. Fradenburgh, Fairfield; Gordon G. Miller, Shelton, both of Conn.

[73] Assignee: United Technologies Corporation, Hartford, Conn.

[21] Appl. No.: 664,736

[22] Filed: Mar. 5, 1991

[51] Int. Cl.⁵ .................. B64C 27/51; F16D 57/00
[52] U.S. Cl. ............................. 416/140; 416/106; 188/290
[58] Field of Search ............... 416/140, 106; 188/296, 188/290, 276

[56] References Cited

U.S. PATENT DOCUMENTS

| | | | |
|---|---|---|---|
| 2,853,141 | 9/1958 | Leoni | 416/106 |
| 2,881,868 | 4/1959 | Frykman | 188/276 |
| 3,119,469 | 1/1964 | Farr et al. | 188/276 |
| 3,536,175 | 10/1970 | Kawabe et al. | 188/296 |
| 3,907,079 | 9/1975 | Chapman | 188/290 |
| 4,576,252 | 3/1986 | Omata | 188/322.5 |
| 4,691,811 | 9/1987 | Arakawa et al. | 188/290 |
| 4,908,905 | 3/1990 | Kanno et al. | 188/290 |

Primary Examiner—Edward K. Look
Assistant Examiner—Michael S. Lee
Attorney, Agent, or Firm—Russell M. Lipes, Jr.

[57] ABSTRACT

A viscous damper for a helicopter rotor blade having a stator member and a rotor member each having a plurality of flanges of different diameter defining cylindrical internal and external shear surfaces, respectfully, and a shear gap therebetween, one stator member internal shear surface having two diameters, the shear gap distances between proportional to radius, and a coaxial rotor member comprising two discs having outer cylindrical shaped shear suraces forming a shear gap with adjacent stator member shear surfaces and one rotor disc being axially movable so that a variable portion of its shear surface is opposite both of the diameters of the stator member two-diameter internal shear surface.

12 Claims, 1 Drawing Sheet

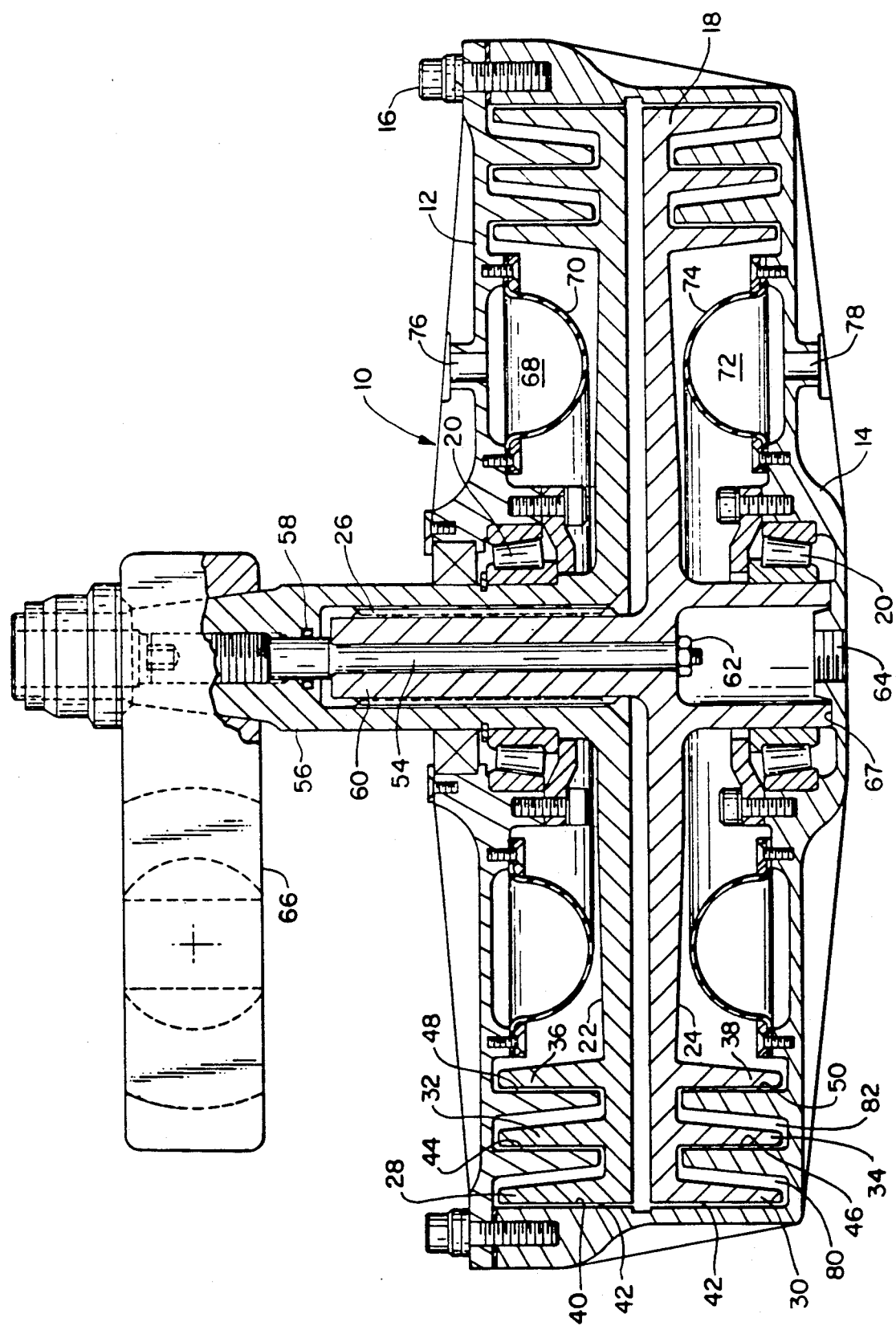

ADJUSTMENT MEANS FOR HELICOPTER ROTOR BLADE VISCOUS DAMPER

DESCRIPTION

1. Technical Field

This invention relates to helicopter rotor blade rotary viscous dampers and more particularly to establishing uniform damping force from one damper to another and compensating for the effects of temperature on the viscosity of the damping fluid.

2. Background Art

A helicopter rotor blade damper serves to inhibit forced self-excited resonate vibration, in an edgewise direction, which occurs naturally in flight as a result of aerodynamic drag loads and/or Coriolis forces. Typically, a "lead-lag" damper involves a piston and cylinder arrangement and hydraulic fluid which is worked by translation of the piston. The cylinder or housing is articulately mounted to the rotor hub and the piston is similarly mounted to the leading or trailing edge of the rotor blade root end. As the rotor blade arcs fore and aft, leads and lags, about a vertical hinge or axis, fluid translates through a damping orifice located in the piston and between chambers on either side of the piston due to the pressure differential established by motion of the piston on the incompressible hydraulic fluid medium.

The typical damper does require high tolerance machining to attain acceptable damping efficiency. Further, high pressures developed in working the fluid can result in leakage problems and pitch and flap motion result in damper wear. In order to resolve these problems, viscous and elastomeric dampers have been employed. Viscous dampers perform work and dissipate energy by shearing a fluid between closely spaced plates or surfaces. The limitation of viscous dampers, however, is their inability to operate consistently across a wide temperature spectrum. As temperature changes, the viscosity of the working fluid changes significantly and thus the damping efficiency changes. Viscous dampers are also difficult or impossible to adjust so that all units have the same properties.

Elastomeric dampers dissipate energy by shear deformation of a plurality of elastomer laminates. Such dampers require that stiffness properties be highly accurate from one damper to the next; otherwise, the rotor blades will have different natural in-plane rotor frequencies and motions, resulting in vibrations and, in extreme cases, divergent instability. The energy dissipation properties and stiffness of elastomers also change with temperature and with age.

SUMMARY OF THE INVENTION

An object of the invention is to provide an adjusting means for rotary viscous dampers for establishing the initial damper setting such that close machining tolerances need not be required during major assembly and uniform damping efficiency may be established from one damper to the next about the rotor azimuth.

Another object of the invention is to provide an automatic temperature compensation feature, to reduce the variation in damping properties wit temperature changes.

The foregoing and other objects, features and advantages will be apparent from the specification and claims and from the accompanying drawing which illustrates an embodiment of the invention.

BRIEF DESCRIPTION OF THE DRAWING

FIG. 1 is a section through a rotor blade viscous damper in accordance with this invention.

BEST MODE FOR CARRYING OUT THE INVENTION

In the rotary viscous damper of FIG. 1, cylindrical stator member 10 includes upper plate 12 and lower plate 14 connected together by bolts 16. Rotor member 18 is mounted in coaxial relationship within stator member 10 by a pair of rolling element bearings 20 and consists of upper rotor disc 22 and lower rotor disc 24 which are connected together by spline 26. Both the stator member and the rotor member have a number of cylindrical flanges defining shear surfaces by their relative radial location with respect to each other. The upper rotor and the lower rotor discs have an outer flange having a cylindrical shaped rotary shear surface, 28 on upper rotor disc 22 and 30 on lower rotor disc 24. In addition, the upper and lower rotor discs have an intermediate flange having a cylindrical shaped external rotary shear surface, 32 on upper rotor disc 22 and 34 on lower rotor disc 24, and an inner flange having a cylindrical shaped external rotary shear surface, 36 on upper rotor disc 22 and 38 on lower rotor disc 24.

Stator member 10 has on lower plate 14 a cylindrical shaped stationary shear surface 40 closely spaced and aligned with rotor member shear surfaces 28 and 30 and forming shear gap 42 therebetween. In addition, the upper and lower plates have an intermediate flange having a cylindrical shaped internal stationary shear surface, 44 on upper plate 12 and 46 on lower plate 18, forming shear gaps with rotor shear surfaces 32 and 34, respectively. The upper and lower plates also have an inner flange having a cylindrical shaped internal stationary shear surface, 48 on upper plate 12 and 50 on lower plate 18, forming shear gaps with rotor shear surfaces 36 and 38, respectively. The gaps and cavities of the assembled damper are filled with a high-viscosity fluid such as silicone oil.

Rotor member 18 may be made of a material such as aluminum having a higher thermal coefficient of expansion than the material used for stator member 10, which may be steel. With selective use of materials, as fluid viscosity changes with temperature changes, the gap between adjacent cylindrical shear surfaces will increase or decrease accordingly, keeping the damping effect constant.

In the area of stationary shear surface 40 midway between its ends and between upper rotor disc 22 and lower rotor disc 24, the shear surface is grooved to define shear surface 52 having a slightly larger diameter than surface 40. This surface allows for compensation of the damper to offset machining differences and establish uniform damping efficiency from one damper to another damper about the helicopter rotor azimuth. This is accomplished by varying the axial position of lower rotor disc 24 with respect to upper rotor disc 22. As the lower rotor disc is moved upward, the spacing between the two rotor discs decreases and an increasing amount of the upper portion of rotary shear face 30 will be opposite shear surface 52 and the gap between these surfaces will be larger than shear gap 42. Thus, displacement of the lower rotor disc changes the damping efficiency of this viscous damper by aligning a variable portion of rotating shear surface 30 with larger diameter stationary shear surface 52, a gap which provides negligible shear resistance. In addition, the effective shear area between surfaces 34 and 46, and between surfaces 38 and 50, is varied, increasing the magnitude of the adjustment.

Adjusting screw 54 is threaded into the end of shaft 56 for upper rotor disc 22 and is sealed by 'O' ring 58. The screw extends through shaft 60 for lower rotor disc 24 and has retaining ring or nut 62 at its lower end to retain the lower rotor disc in position. Threaded hole 64 in lower plate 14 provides for assembly of the retaining member on the screw. A plug, not shown, could be installed in the threaded hole. The internal surface of shaft 56 is connected by spline 26 to the external surface of shaft 60 for lower rotor disc 24. Rotation of the adjusting screw will result in movement of lower rotor disc 24 along spline 26 to vary its axial position with respect to upper rotor disc 22 and will vary the area of rotary shear surface 30 exposed to larger diameter shear gap 52. Also, the shear areas 34/46 and 38/50 as well as 30/42 increase or decrease to change damping. Stop 66 on lower plate 14 limits the axial adjustment of lower rotor disc 24. Variation of the damping area varies the damping output of the viscous damper and, in accordance with the object of the invention, enables the calibrating of a plurality of dampers to a desired damping effectiveness.

Shaft 56 is connected by link arm 66 to a connecting rod which in turn attaches to the leading or trailing edge of a rotor blade, not shown. Rotary motion is imparted to rotor member 18 by this arm. Stator member 10 is connected to the rotor head, not shown.

Annular chamber 68 formed by flexible wall 70 in stator upper plate 12 and annular chamber 72 formed by flexible wall 74 in stator lower plate 14 provide for possible changes in damping fluid volume and for the pressurizing of the viscous fluid in the damper. This is done to insure a standard level of performance of the damper. Air or other pressurizing gas is admitted to chamber 68 through inlet 76 and to chamber 72 through inlet 78.

The shear force equation is $F = u\, AV/d$, where $u$ is the coefficient of viscosity, $A$ is area, $V$ is velocity, and $d$ is gap distance. Thus, as fluid viscosity, $u$, decreases with a temperature increase, it is apparent that shear force can be kept constant at a fixed shear area, $A$, and rotational speed, $V$, by decreasing the gap distance, $d$. This is accomplished, as described above, by the use of dissimilar materials for stator member 10 and rotor member 18 with the rotor member being of a material having a higher coefficient of expansion than the stator member. With such materials, the gap between shear surfaces would decrease as temperature increases, and fluid viscosity decreases.

The secondary gaps between the inside surfaces of the two outer rotor member flanges and the outside surfaces of the two inner stator member flanges, as generally identified at 80 and 82, are considerably larger than the "working" shear gaps to allow the temperature compensation feature to work. Variations of the secondary gaps doesn't alter shear forces significantly. The built-in "working" shear gaps, that is the width of shear gap 40, the distance between surfaces 32-34 and 44-46, and the distance between surfaces 36-38 and 48-50 is proportional to their radial distance from the center line or rotational axis of the damper so that the percentage change in gap width for all flanges is the same as temperature changes.

It should be understood that the invention is not limited to the particular embodiment shown and described herein, but that various changes and modifications may be made without departing from the spirit or scope of this concept as defined by the following claims.

We claim:

1. A helicopter rotor blade viscous damper, said damper having a stator member and a rotor member, said stator member having an internal cylindrical surface of a first diameter and said rotor member having an external cylindrical surface of slightly smaller diameter than said stator member internal cylindrical surface and defining a shear gap therebetween, said rotor member consisting of two axial aligned rotor discs, one of which has a fixed axial position within said stator member and the other of which is movable axially within said stator member, said damper containing a high-viscosity fluid.

2. A helicopter rotor blade viscous damper in accordance with claim 1 in which the rotor member is made of a material of higher coefficient of thermal expansion than the material of the stator member.

3. A helicopter rotor blade viscous damper in accordance with claim 1 in which the stator member and the rotor member each have a plurality of cylindrical surfaces of different diameter defining shear gaps therebetween.

4. A helicopter rotor blade viscous damper, said damper having a stator member and a rotor member, said stator member having an internal cylindrical surface of a first diameter and said rotor member having an external cylindrical surface of slightly smaller diameter than said stator member internal cylindrical surface and defining a shear gap therebetween, said stator member internal cylindrical surface having a groove defining a second internal cylindrical surface of larger diameter than said first diameter surface, said rotor member consisting of two axial aligned rotor discs, one of which has a fixed axial position within said stator member and the other of which is movable axially within said stator member, said damper containing a high-viscosity fluid.

5. A helicopter rotor blade viscous damper in accordance with claim 4 in which the larger diameter cylindrical surface of the stator member is located about midway between the ends of said cylindrical surface of a first diameter.

6. A helicopter rotor blade viscous damper, said damper having a stator member having a first internal cylindrical surface of a first diameter and a first width and a second internal cylindrical surface of a larger diameter and a relatively narrow width, said damper also having a rotor member coaxial with said stator member and consisting of two axial aligned discs, one of which has a fixed axial position within said stator member and the other of which is movable axially with respect to said stator member, each disc having an external cylindrical surface of the same diameter and slightly smaller than the first diameter of said stator internal cylindrical surface to define a shear gap therewith, said axially movable rotor disc being located so that a variable width of its external cylindrical surface may be opposite the larger diameter cylindrical surface of said stator member, said damper containing a high-viscosity fluid.

7. A helicopter rotor blade viscous damper in accordance with claim 6 in which the larger diameter internal cylindrical surface of the stator member is located about midway between the ends of the first internal cylindrical surface.

8. A helicopter rotor blade viscous damper in accordance with claim 6 which has means for manually adjusting the relative axial position of the two rotor discs.

9. A helicopter rotor blade viscous damper in accordance with claim 6 in which the rotor discs are splined together and screw thread means is employed to vary the relative axial position of the movable disc with respect to the fixed axial position disc.

10. A helicopter rotor blade viscous damper in accordance with claim 6 in which the damper contains a viscous fluid and has means for pressurizing the fluid.

11. A helicopter rotor blade viscous damper in accordance with claim 6 in which the stator member and the rotor member each have a plurality of cylindrical surfaces of different diameter defining shear gaps therebetween.

12. A helicopter rotor blade viscous damper, said damper having a stator member and a rotor member, said stator member having an internal cylindrical surface of a first diameter and said rotor member having an external cylindrical surface of slightly smaller diameter than said stator member internal cylindrical surface and defining a shear gap therebetween, the rotor member being made of a material of higher coefficient of thermal expansion than the material of the stator member, said stator member and said rotor member having a plurality of flanges of successively smaller diameter than said stator member first diameter cylindrical surface, cylindrical surfaces of said stator member flanges and adjacent and closely spaced cylindrical surfaces of said rotor member flanges forming shear gaps therebetween, the shear gaps being proportional to their radial distance from the rotational axis of the damper, the surfaces of said stator and rotor flanges which are opposite and not closely spaced being spaced apart a significantly greater distance than said stator and rotor member closely spaced cylindrical surfaces, said damper containing a high-viscosity fluid.

* * * * *

UNITED STATES PATENT AND TRADEMARK OFFICE
CERTIFICATE OF CORRECTION

PATENT NO. : 5,116,201
DATED : May 26, 1992
INVENTOR(S) : Evan A. Fradenburgh et al It is certified that error appears in the above-identified patent and that said Letters Patent is hereby corrected as shown below:

In the Abstract, line 9, "suraces" should be --surfaces --.
Column 1, line 65, "wit" should be --with--.

Signed and Sealed this

Fifth Day of October, 1993

Attest:

BRUCE LEHMAN

*Attesting Officer*  *Commissioner of Patents and Trademarks*